July 27, 1937.  E. T. HERMANN  2,087,973
ACOUSTIC MATERIAL
Original Filed July 6, 1931   3 Sheets-Sheet 1

INVENTOR.
Earnest T. Hermann,
BY
ATTORNEYS.

July 27, 1937. E. T. HERMANN 2,087,973
ACOUSTIC MATERIAL
Original Filed July 6, 1931   3 Sheets-Sheet 3

INVENTOR.
Earnest T. Hermann,
BY
ATTORNEYS.

Patented July 27, 1937

2,087,973

UNITED STATES PATENT OFFICE 2,087,973

ACOUSTIC MATERIAL

Earnest T. Hermann, El Segundo, Calif.

Application July 6, 1931, Serial No. 548,905
Renewed November 2, 1936

2 Claims. (Cl. 72—18)

This invention pertains to fluid pervious bodies for acoustic or other purposes and particularly to a fluid pervious body of heat-bonded ceramic composition.

The principal object of my invention is to provide a novel and advantageous type of ceramic fluid pervious material.

A more specific object of my invention is to provide a ceramic fluid pervious body having a high percentage of mutually intercommunicating voids therewithin open to free communication with the medium surrounding said body at the surface of said body, composed of intermingled and supportingly interbonded fragmentary or filamentary particles of heat-bonded argillaceous material, for use in industry and the arts as an acoustic material of particularly high sound absorbing characteristics, as a matrix for the support of catalytic agents, contact materials or the like, as a filtration medium, or for other purposes for which the structure of such a body renders it suitable.

In the present application, description of the various forms of ceramic fluid pervious bodies of my invention will be confined, in order to avoid a duplication of description, to the construction and preparation of a ceramic fluid pervious class of bodies for use as an acoustic material. In this regard, reference will be made to the internal surfaces of the various bodies as "reflecting surfaces" which surfaces, dependent upon the use to which a particular body may be put, may serve in a particular manner according to that use, as, in the case of the use of said bodies as a matrix for the support of a catalytic agent or the like, said surfaces may play the part of contact surfaces. It will be understood that no limitation of the ceramic bodies of my invention to any particular use is either expressed or implied, the description thereof as an acoustic material being solely for purposes of brevity.

An acoustic material of the present invention may be used as a lining for lecture chambers, auditoriums and the like, wherein the material, due to the very limited plane reflecting area at the surface face thereof, reflects a very small percentage of incident sound, and, due to the large number of mutually intercommunicating voids therein, permits penetration of sound to within said material whereupon the successive reflection of said sound by the multiplicity of reflection surfaces offered by the body obtains complete or substantially complete absorption of said sound. The material is also particularly adapted for the above use by reason of its marked fire resistant and retardant characteristics and its high mechanical strength in proportion to its weight.

The ceramic fluid pervious body of my invention may be produced by shaving or tearing filamentary or fragmentary particles from a plastic or semi-plastic body of ceramic material, arranging such particles in any desired manner and then causing them to interbond, as hereinafter described. A ceramic body according to my invention may also be made by extruding a plastic mass of suitable consistency through a die into a mold or other suitable receptacle in such a manner as to form a body formed of filaments or particles as above described in which the filaments or particles are intermingled and supportingly contacting one another at points distributed throughout said body, while leaving intercommunicating voids therebetween, and then causing the particles to interbond so as to form an integral body of high mechanical strength containing a high percentage of mutually intercommunicating voids as shown in some of the accompanying illustrations. These filamentary or fragmentary particles may also be provided, if desired, with additional external reflecting surfaces, as for example by coating said particles with a granular or crystalline material after the formation thereof and before or after the assembly thereof into a fluid pervious body, or said particles may be provided with internal voids or passages formed in the individual particles themselves, as hereinafter described.

Throughout the specification and claims of this application, the term "particle" is used in the sense of a unitary body constituting an element of the built-up mass. It will be understood that each of the so-called "particles" is composed of a plurality of smaller grains or particles of argillaceous material, either with or without any added material, combustible or refractory. Each of such "particles" is torn, cut, shaved or otherwise formed as an agglomerate mass of such smaller grains, and said agglomerate mass is subsequently altered to an integral mass on firing to produce a ceramic bond between the small aggregated grains. This bonding of the grains within the particles may take place during the same firing operation as the bonding of the particles to one another to form the completed body, or it may be effected in a separate firing operation as hereinafter described.

An acoustic material formed as a fluid pervious body according to my invention, when provided with particles having additional external reflecting surfaces as above described, possesses very high sound absorption characteristics by virtue of the combination of a multiplicity of mutually intercommunicating voids open to free communication with the medium surrounding said body with the multiplicity of secondary reflecting surfaces offered by the particles themselves.

This is due to the fact that the voids between the particles permit the sound waves to enter the body freely and the smaller, more numerous, surfaces comprised by the externally attached granular material or the internally formed voids of the particles occasion, in a broad sense, an infinitude of successive reflections of said sound waves with attendant absorption thereof. In this manner a very small amount of the original wave front striking the body is reflected back into the medium adacent said body.

It is well known that the absorption of sound by a reflecting surface is dependent upon the ability of that surface to convert, by being set into motion, a portion of the incident sound energy into heat. When an acoustic body is composed of a material high in intrinsic sound absorptivity there are necessary but a few successive reflections of a sound wave in order to reduce the intensity of that wave to a desirable minimum, however, when an acoustic body is composed of material low in intrinsic sound absorptivity there must be, necessarily, a great number of successive reflections of a sound wave in order to sufficiently absorb said wave. A body constructed according to my invention will offer, even though fabricated of a material low in intrinsic sound absorptivity, very high total absorption due to the fact that the body is pervious to the medium which carries the sound waves, permitting the penetration of said waves to the interior of the body, accompanied by a progressive reflecting absorption of said waves by the particles of body material.

The accompanying drawings illustrate embodiments of my invention and referring thereto:

Figure 1:
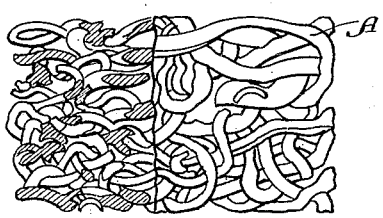
Fig. 1 is a partly sectional face view of a type of ceramic fluid pervious body according to my invention, on an enlarged scale.
Figure 2:
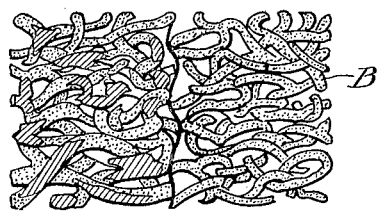
Fig. 2 is a similar view of another type of ceramic fluid pervious body of my invention.

Figs. 1 and 2 illustrate two forms of bodies which may be formed by shaving filamentary particles from a block of ceramic material. The body shown in Fig. 1 may be formed by shaving the particles A into a suitable receptacle, and exposing them to an argillaceous spray, for example, one such as is known to the art as a "slip", during the travel of such particles from the shaving apparatus to the receptacle. The slip may be supplied by any suitable form of spraying apparatus which will effect a fairly uniform coating of the particles, and after the particles have properly dried, the body may be fired to the appropriate temperature to provide the desired ceramic inter-bond. The body shown in Fig. 2 may be formed substantially as above, except that the particles B are subjected to a spray or blast of finely divided material such as silica, tripoli, volcanic ash or the like, through the agency of a suitable dusting means, in addition to the coating of argillaceous slip material.

The particles are sprayed with an aqueous mixture as above described so as to soften the surface of the particles and obtain a plastic surface condition which allows of a plastic bond between the particles when the same intercontact in the receptacle. The cuttings are preferably made from a block of suitable clay material which is of relatively low water content, for example from 15 to 20 per cent, so as to permit satisfactory cutting of particles or filaments from the surface thereof, and no appreciable bond is obtained between the particles without added water or an aqueous argillaceous mixture.

The above forms of pervious ceramic bodies may be formed as described or may, if desired, be formed by shaving the particles into a receptacle and firing without any added aqueous agent, so as to convert each particle into a ceramically bonded unit without developing any substantial bond between the particles, after which the particles may be molded and saturated or coated with a mixture of plastic clay and water, allowed to set or dry, and then refired, in which case the interbonding of the particles is produced by the argillaceous mixture applied to the surfaces of the particles and is of high mechanical strength.

In the preparation of a body according to this procedure, the spraying or saturating mixture may comprise a mixture of finely ground plastic clay, water, and sodium silicate or other agent capable of affording some strength to the bonding mixture upon drying. A mixture which has been satisfactorily used in this connection, consists of water 60 parts, finely divided plastic clay or slip 10 to 20 parts and sodium silicate approximately 1 per cent.

The above mixture serves to coat each particle with a thin coating of plastic clay and adjacent particles are thus provided with an envelope which serves, upon firing, to bond such particles into an integral body. This mixture or slip is preferably composed of a material which will bond at a temperature slightly lower than that necessary for producing the bond in the particles so that in the refiring operation the bonding of the slip may take place at a temperature below the softening point of the particles, avoiding undue sagging and warping.

From 5 to 10 parts of petroleum coke of 60 mesh or finer may be incorporated in the above coating mixture if desired, and in this case the coating is applied to the particles in such amount that the thickness of the coating is not materially greater than the average dimension of the coke particles, so that when the body is fired the coke particles will burn out and leave pits in the surface of the particles extending through the coating. In this manner, a great number of interruptions in the particle surface is obtained, which materially adds to the acoustic properties of a body formed in this way.

Figure 8:
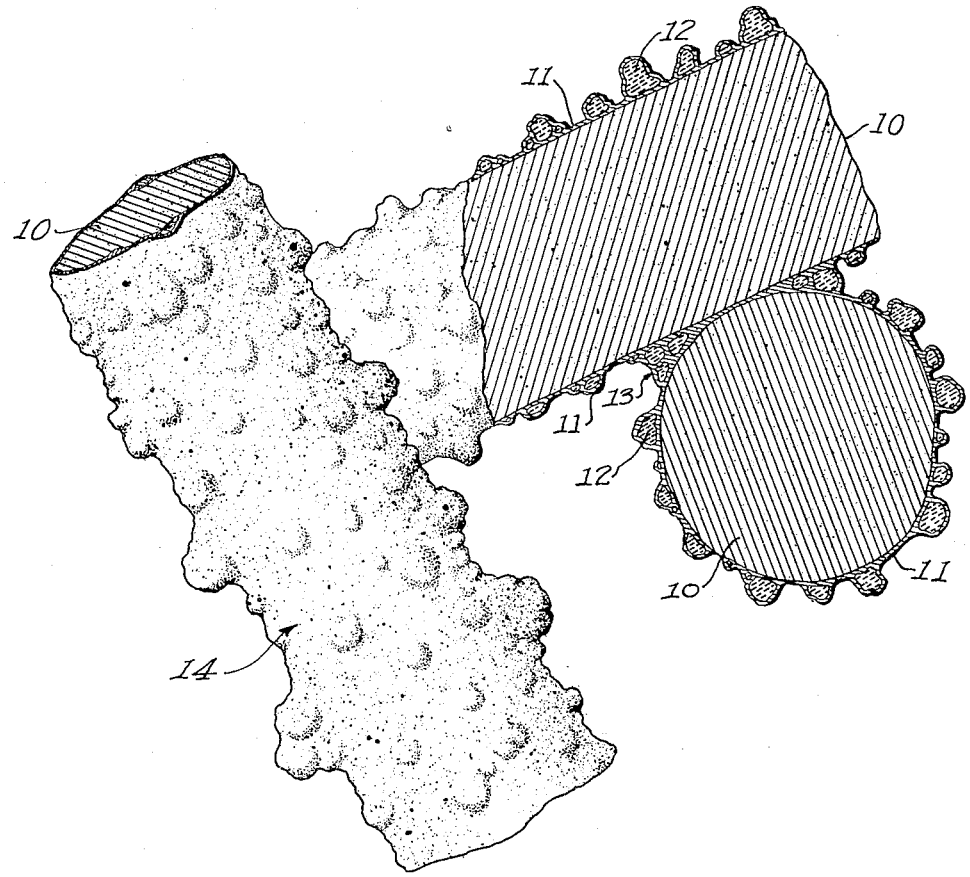
Fig. 8 is a partly broken-away large scale showing of one type of material of the present invention.

The form of particle illustrated in Fig. 8 is one provided with an irregular surface texture produced by incorporating a granular material in the coating mixture, and referring thereto, ceramic particles in the form of extruded filaments are indicated at 10, the ceramic "slip" coating is indicated at 11, and the relatively coarse particles of refractory material are indicated at 12. These particles may be, as above described, a crystalline or granular material, and are preferably of a refractory nature at the temperature to which the body is subjected in the firing operation. A crushed pre-fired ceramic material has been found to be entirely suitable for this purpose. As the particles are fired, the slip coating will serve to bond the adjacent filaments together as shown at 13, and an irregular surface texture will be provided for each filament as indicated at 14. It will be appreciated that the filaments 10 may be formed by shaving, slicing, or the like, and that this form of the invention is obviously not limited to an extrusion procedure.

Coloring matter such as metallic oxides may be incorporated in the mixture used to spray or coat the fired or unfired particles, obtaining a colored product which may be used, for example, as a wall surfacing which will harmonize with a particular color scheme. An irregular texture may be provided to the particles by incorporating a crystalline or granular material of relatively large particle size in the coating mixture, such as, for example, silica, volcanic ash or crushed pre-fired ceramic material or the like, such material being preferably refractory at the firing temperature of the body.

It will be understood that, in the formation of any of the forms of ceramic particles or bodies herein described, a combustible material such as petroleum coke, sawdust, or the like may be incorporated in the ceramic material from which the particles are to be formed, which will be subsequently removed from such particles during the firing operation, obtaining intercommunicating and surface communicating voids in such particles.

A relatively coarse refractory material, such as, for example, crushed pre-fired ceramic material, may be incorporated in the ceramic material from which the particles are to be formed, around which the body material will contract upon firing due to shrinkage, and provide a multiplicity of surface irregularities to each particle.

Figure 3:
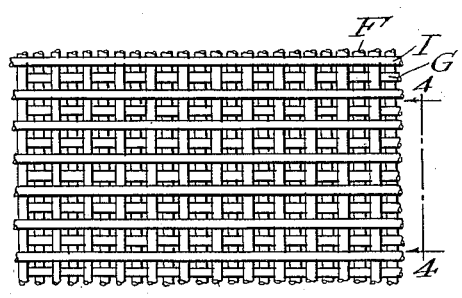
Fig. 3 is a face view of an additional type of fluid pervious body.
Figure 4:
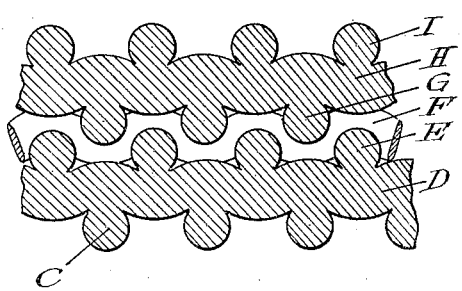
Fig. 4 is an enlarged section of the same on line 4—4 in Fig. 3.

A pervious body of the type shown in Figs. 3 and 4, may be formed by extruding plastic clay material from a suitable extrusion device of any well-known type to form a layer C of parallel strands or filaments onto a movable receptacle, the receptacle being turned through substantially 90° and another layer D extruded and the process repeated to obtain layers E to I for example, to form a complete body. A body is thus built up which is composed of alternately tranverse layers of parallel filaments, as shown, which may then be fired as above. This form of body is described in detail in my pending application, Ser. No. 528,224, filed April 6, 1931, "Pervious body for acoustic or other purposes and method of making the same."

Figure 5:
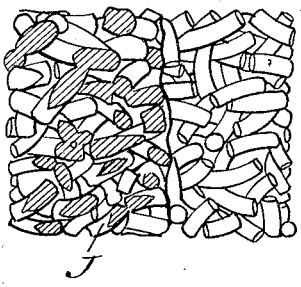
Fig. 5 is a partly sectional face view of an alternative form of ceramic body according to the present invention.

The form of body illustrated in Fig. 5 may be formed by extruding cylindrically shaped particles J from a suitable type of extrusion mechanism provided with means for cutting the extruded particles into short lengths. The particles J are thus in the form of heavy filaments or rods and these particles may be sprayed, as above, with a slip or the like during travel therefrom from the extrusion device to the receptacle in which the body is formed, or the particles may be dried and fired without such slip, and then suitably coated with a slip and formed into a body, dried and re-fired, in which case the slip is preferably of such character as to provide a ceramic inter-bond at a temperature below that to which the filaments were fired in the first firing.

Figure 6:
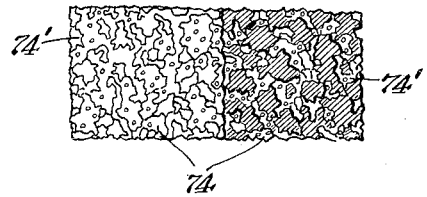
Fig. 6 is a partly sectional face view of an alternative form of ceramic fluid pervious body of my invention.

The body illustrated in Fig. 6 may be formed by disintegrating a body of semi-plastic ceramic material containing a considerable percentage of grog, a crushed pre-fired body or the like, through the agency of a plurality of disintegrating blades or the like mounted on a rotatable or otherwise movable member and forced into contact with such material. The particles thus cut away from the body of semi-plastic material may be caught in a suitable receptacle and fired as above described in connection with the rods J, and subsequently sprayed or dipped in this slip, moulded and re-fired, or such particles may be sprayed with a slip mixture as described in connection with Figs. 1 and 2. In Fig. 6 the particles are shown at 74 and the inter-communicating voids are shown at 74'.

It will be understood that various modifications of the above described ceramic bodies may be made, the above description being for the purpose of illustrating several different types of such bodies so formed as to be of light weight, of high structural strength and of particularly high acoustic absorptivity.

Figure 7:
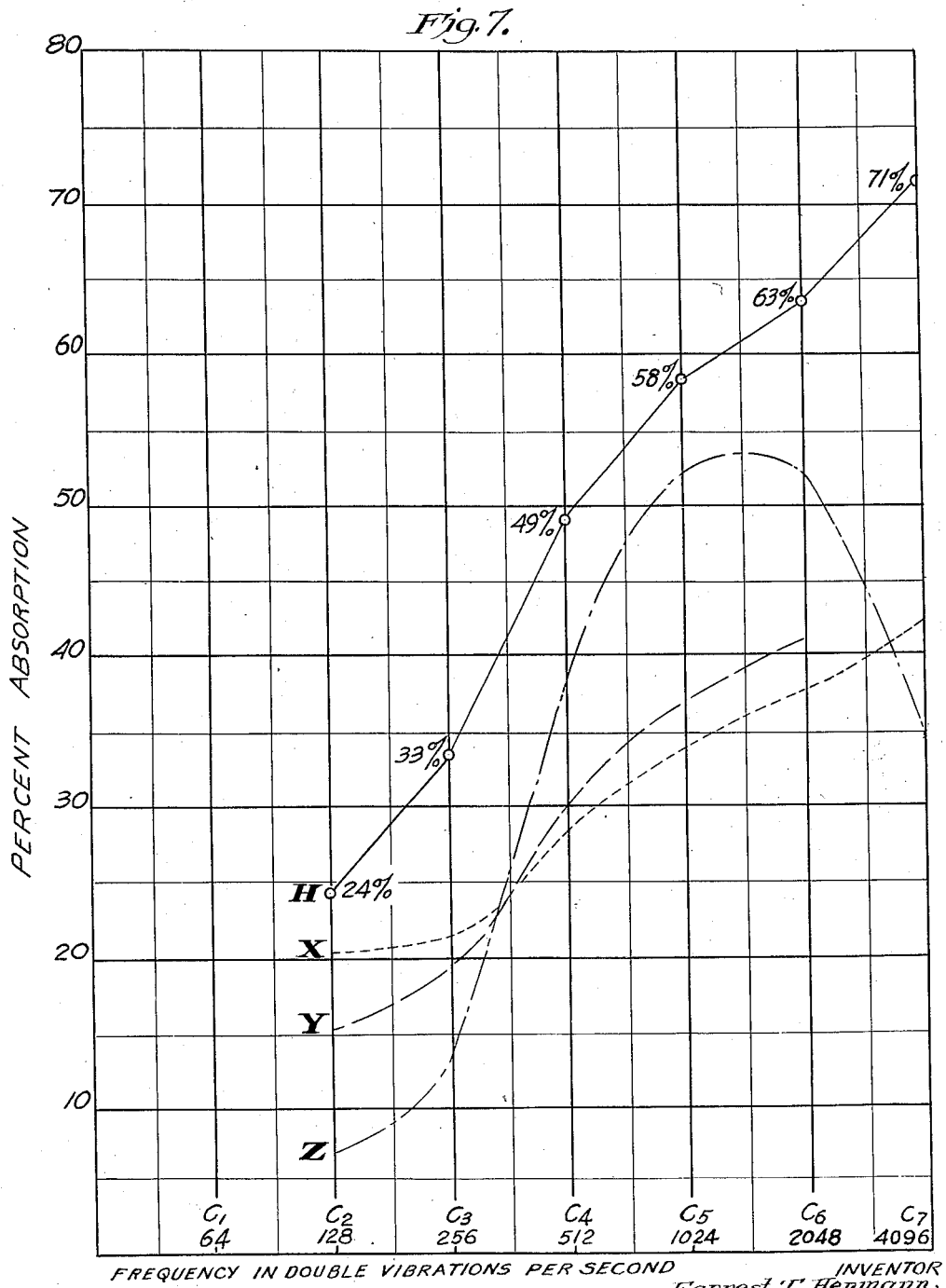
Fig. 7 is a chart showing the acoustic absorptivity of a body of the present invention compared with the acoustic efficiencies claimed in advertising matter for the best of several types of sound absorbent material now commercially available, the efficiencies being shown at points between $C_1$ and $C_6$.

In Fig. 7 there is shown graphically the sound absorption efficiencies of four different types of acoustic materials at six different frequencies, ranging from 128 double vibrations per second (one octave below middle C) to 4096 double vibrations per second (four octaves above middle C). The curve marked H is taken from a report made on an acoustic body of the present invention, said report being submitted by Dr. Verne O. Knudsen, internationally known authority on acoustics. The curves marked X, Y and Z are taken from advertising matter pertaining to three well known substantially mineral acoustic materials of the better grade. Curve X represents the efficiencies of an acoustic plaster composed of a mineral aggregate and a mineral binder of the Portland cement type; curve Y represents the efficiencies of a wall surface material composed of composite mineral and non-mineral aggregate; and curve Z represents the efficiencies of a mineral wall surface material described as a "sound absorbing stone".

The following table represents the relative acoustical efficiencies of a material according to this invention at various pitches as compared with the other types of materials:

| Test pitch | Percent abs. | Against "X" | Against "Y" | Against "Z" |
| --- | --- | --- | --- | --- |
| | | Percent | Percent | Percent |
| $C_2$ (128 d. v.) | 24 | +115 | +160 | +340 |
| $C_3$ (256 d. v.) | 33 | +155 | +170 | +250 |
| $C_4$ (512 d. v.) | 49 | +200 | +165 | +130 |
| $C_5$ (1024 d. v.) | 58 | +170 | +160 | +110 |
| $C_6$ (2048 d. v.) | 62 | +165 | +150 | +120 |
| $C_7$ (4096 d. v.) | 71 | +165 | | +200 |

The acoustic body of the present invention is thus of materially greater efficiency throughout the entire range of tests and is particularly efficient over that portion of the musical scale ($C_2$ to $C_4$) in which the predominating pitches of the human voice fall, making the material of marked value in the lining of lecture rooms and the like. It is obvious, also, that the fire retarding nature of the material contributes to its value as a wall surface material.

I claim:

1. A ceramic pervious body comprising ceramic particles provided with an interbonding ceramic surface coating and providing a high percentage of mutually intercommunicating voids therebetween and a multiplicity of internal surfaces defining said voids, said voids being open to free communication with the medium surrounding said body at the surface of said body, and said ceramic surface coating having incorporated therewithin relatively coarse particles of refractory material.

2. A ceramic pervious body for acoustic purposes comprising ceramic particles provided with an interbonding ceramic surface coating and providing a high percentage of mutually intercommunicating voids therebetween and a multiplicity of internal sound reflecting surfaces defining said voids, said voids being open to free communication with the medium surrounding said body at the surface of said body, and said interbonding ceramic surface coating having incorporated therewithin relatively coarse particles of refractory material serving to provide irregularities in said reflecting surfaces.

EARNEST T. HERMANN.